UNITED STATES PATENT OFFICE 2,426,194

INK

Adolph Fischbach and Maurice Friedman, Asbury Park, N. J., assignors to the United States of America, as represented by the Secretary of War No Drawing. Application April 4, 1944, Serial No. 529,442

2 Claims. (Cl. 106—29)

(Granted under the act of March 3, 1883, as amended April 30, 1928; 370 O. G. 757)

The invention described herein may be manufactured and used by or for the Government for governmental purposes, without the payment to us of any royalty thereon.

Our invention relates to a printing ink capable of operating over a temperature range from minus 45° Fahrenheit to plus 150° Fahrenheit and more especially for use with ciphering machines, and ink dispensing devices at the lower temperatures of the colder climates.

Prior to the present invention no known suitable ink has been compounded which would efficiently operate over the described temperature range.

The available inks tried at the low temperatures would not thoroughly wet the metal type and rollers or flow freely from the inking devices. In addition, the characters or letters would not be clearly printed, the outlines being indistinct and sometimes entirely blank.

The objects of this invention are:

To provide a new and improved ink which will remain fluid over a low to high temperature range.

To provide a new and improved ink of any color which operates satisfactorily over a low to high temperature range.

To provide a new and improved ink which will not separate on standing over a low to high temperature range.

To provide a new and improved ink which remains homogeneous over a low to high temperature range.

To provide a new and improved ink which will thoroughly wet the metal type and roller used in printing.

To provide a new and improved ink that will flow freely from the inking devices.

To provide a new and improved ink that will clearly print the outlines distinctly and which will under low temperatures avoid the blanking which many times heretofore occurred with other inks.

To provide a new and improved ink that will decrease the degree of so-called "feathering" of the printed characters.

These and other objects apparent from a reading of the specification and claims are accomplished with the formula disclosed in the following application and outlined in the appended claims.

One formula in accordance with our invention which has been found satisfactory for the manufacture of the ink herein described is:

Butyl carbitol—diethylene glyco monobutyl ether _____ parts by weight __ 90
Printing ink varnish _____ do ____ 10
"Aerosol O. T."—dioctyl sodium sulfo succinate _____ per cent by weight [1] __ 0.2
Methyl violet—penta-methylpararosaniline per cent by weight [1] __ 10

[1] Of combined solvents.

One method of making the ink which we have used and found to be successful is as follows:

Butyl carbitol was heated to a temperature of 60° C. and the varnish which may be varied from 1 part to 10 parts by weight was then added slowly with constant stirring. The mixture was then digested at that temperature for several minutes and the "Aerosol O. T." was then brought into solution. When the temperature fell to about 38° C., the methyl violet was slowly incorporated with very thorough and energetic agitation.

Butyl carbitol is an organic solvent for the pigment or dye to be used in obtaining the proper color for the ink. Butyl carbitol has a boiling point of 222° C. The parts by weight of butyl carbitol may be varied from that given in the above formula. Organic solvents with boiling points of 220° C. and above and having similar chemical and physical properties may be substituted for the butyl carbitol.

The printing ink varnish used in the above formula is the usual type of printing ink varnish consisting of rosin and other varnish gums and possibly waxes; together with linseed oil or other suitable oils. The varnish acts as a moisture-proofing agent as well as giving "body" to the ink. It probably serves also in contributing rosin to the ink, an ingredient which would decrease the degree of "feathering" of the printed characters. While we have specified herein printing ink varnish, it is to be understood that any rosin varnish could be used in place of the one specified. The rosin of the printing ink varnish serves to size the paper as it is being printed on while the linseed oil of the same printing ink varnish serves to waterproof the ink. This waterproofing is of particular importance at low temperatures where condensation occurs inasmuch as condensation of the moisture upon the ink ordinarily causes the ink to be watered to such a degree as to render it unsuitable for use.

The wetting agent used by us was the sodium salt of sulphonated dioctyl ester of succinic acid or dioctyl ester of sodium sulpho succinic acid. The formula for this wetting agent is:

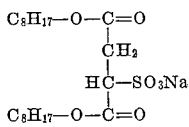

We have used in our herein described method a commercial form of wetting-agent known as "Aerosol O. T." The wetting agent acts by decreasing the surface tension of the ink and makes possible the thorough wetting of the metal type, rollers and the like and also is the active principle which causes the ink to flow freely from the ink dispensing devices at the low temperatures.

Methyl violet is the pigment or dye we used in the herein described embodiment of our invention. Other dyes, soluble in the organic solvents may be used as a substitute for the methyl violet, depending upon what color is desired. The organic ingredient, butyl carbitol, it can be appreciated, is the main vehicle of the ink, and the "Aerosol O. T." is a meniscal agent or ingredient for producing a concave condition or wetting characteristic of all the ingredients when mixed to completion as an ink.

We do not desire to limit the ink composition to any given combination of parts by weight in the above described formula, although we have experimented with several combinations and find the one submitted is preferable.

Having thus described our invention we desire to secure by Letters Patent and claim:

1. A method of making ink of the class described comprising, heating of butyl carbitol to a temperature of approximately 60° C. and adding a printing-ink-varnish slowly while constantly stirring same therein, digesting the mixture of said butyl carbitol and varnish at said temperature for a period of several minutes and adding dioctyl sodium-succinate as a surface-tension-reducing ingredient into the mixture and then allowing the mixture to cool to about 38° C. after which adding methyl violet slowly while subjecting the composition to energetic agitation and then allowing the composition to cool to room temperature, the butyl carbitol and the varnish being present, respectively, substantially in the proportion of 90 parts and 10 parts, by weight, and the dioctyl sodium succinate and the methyl violet being respectively in the amounts of 0.2% and 10%, by weight, of the combined solvents.

2. An ink consisting of 90 parts by weight of butyl carbitol, 10 parts by weight of printing ink varnish, and dioctyl sodium succinate and methyl violet, respectively, in substantially 0.2% and 10%, by weight, of the combined solvents.

ADOLPH FISCHBACH.
MAURICE FRIEDMAN.

REFERENCES CITED

The following references are of record in the file of this patent:

UNITED STATES PATENTS

| Number | Name | Date |
|---|---|---|
| 2,375,230 | Kline | May 8, 1945 |
| 2,208,551 | Waters | July 16, 1940 |
| 2,346,968 | Jeuck et al. | Apr. 18, 1944 |
| 2,342,641 | Cassel | Feb. 29, 1944 |
| 2,306,843 | Bour | Dec. 29, 1942 |
| 2,028,091 | Jaeger | Jan. 14, 1936 |
| 1,954,450 | Laurence | Apr. 10, 1934 |

OTHER REFERENCES

"Pigment Dispersion," Fischer et al., Ind. & Eng. Chem., March, 1923, pages 336–343. (Copy in Scientific Library.)